United States Patent Office 2,698,318
Patented Dec. 28, 1954

2,698,318

RUBBERY INTERPOLYMERS OF BUTADIENE-1,3 HYDROCARBONS WITH POLYUNSATURATED CARBOXYLIC ACIDS

Harold P. Brown, Akron, Ohio, assignor to The B. F. Goodrich Company, New York, N. Y., a corporation of New York No Drawing. Application October 5, 1950, Serial No. 188,651

7 Claims. (Cl. 260—80.7)

The present invention relates to synthetic polymeric materials and to a method of making the same. The invention relates more specifically to plastic rubbery interpolymers formed by polymerization of a monomeric mixture containing at least two essential ingredients, one of which is a butadiene-1,3 hydrocarbon and the other of which is a polyunsaturated carboxylic acid of the class represented by sorbic acid.

It is well known that butadiene-1,3 hydrocarbons interpolymerize with various olefinic materials, called comonomers, to produce plastic rubbery materials which are much stronger, when vulcanized in the usual manner by heating with sulfur, but which, unfortunately, are considerably less resistant to extreme low temperatures, than are the rubbery polymers of the butadiene-1,3 hydrocarbon alone. For example, a comparison of polybutadiene-1,3 with standard GR-S (a rubbery copolymer of about 75 parts of butadiene-1,3 with about 25 parts of styrene as comonomer, and the standard to which other copolymers of butadiene-1,3 are compared) reveals that vulcanizates of the latter generally possess somewhat more than twice the tensile strength (in lbs./sq. in.) of similar vulcanizates of the former, yet vulcanizates of the former retain their flexibility at temperatures more than 20° C. lower than do those of the latter. This condition has long been recognized but heretofore no butadiene-1,3 hydrocarbon interpolymer has been described which possesses the combination of a tensile strength comparable to that of GR-S with low temperature properties comparable to those of polybutadiene-1,3.

I have now discovered, however, that butadiene-1,3 hydrocarbons interpolymerize with sorbic acid, or similar polyunsaturated carboxylic acids as hereinafter described, to produce new rubbery materials which are plastic and easily worked in the raw unvulcanized condition and which possess, in the cured, vulcanized or elasticized condition, a much more favorable balance between tensile strength and low temperature flexibility than do the known rubbery materials. While this favorable balance appears to be inherent in my new rubbery materials and not dependent upon any particular manner in which they are compounded or cured, development of optimum tensile strength, optimum low temperature flexibility and other optimum properties is brought about not by vulcanization of the plastic rubbery material with sulfur, as is the usual manner, but by subjecting them to what I have termed an "elasto-condensation" involving their elasticization or "curing" by reason of a condensation reaction involving the free carboxyl groups present in their structure and an added agent, such as a polyvalent metal oxide, particularly zinc oxide, which is reactive therewith, as is more fully described in my copending application Serial No. 193,521 filed November 1, 1950.

The production of my new rubbery materials is effected by polymerizing in an acidic aqueous medium a monomeric mixture comprising, as essential ingredients, at least 50% by weight of one or more butadiene-1,3 hydrocarbons and an equal or lesser amount of one or more of the polyunsaturated carboxylic acids. Other monomeric materials are not essentially present in the monomeric mixture but, as explained hereinbelow, may be present, if desired.

Butadiene-1,3 hydrocarbons suitable for use in the monomeric mixture include butadiene-1,3 itself, 2-methyl butadiene-1,3 (isoprene), 2,3-dimethyl butadiene-1,3, piperylene, 2-neopentyl butadiene-1,3 and other hydrocarbon homologs of butadiene-1,3.

The polyunsaturated acid present along with the butadiene-1,3 hydrocarbon in the monomeric mixture polymerized may be any of the class of olefinic acids having at least two olefinic double bonds in conjugated relationship and having one of these bonds in alpha-beta position with respect to a carboxyl group. The conjugated olefinic double bonds may be in straight chain relation to carboxyl as in such acids of this class as sorbic acid, beta-vinyl acrylic acid (1-carboxy-butadiene-1,3), 2,4-pentadienoic acid, 2,4,6-octatrienoic acid, 2,4,6,8-decatetraenoic acid, beta styryl acrylic acid (1-carboxy-4-phenyl butadiene-1,3), alpha-methyl sorbic acid, alpha-chloro sorbic acid, alpha-bromo sorbic acid, alpha-ethyl sorbic acid, beta-chloro sorbic acid, beta-, delta- or gamma-, epsilon-dimethyl sorbic acid, alpha-methyl-gamma-benzal crotonic acid, 1-carboxy-1-ethyl-4-phenyl-butadiene-1,3, 2,6-dimethyl decatriene (2,6,8)-oic-10 and the like, or the carboxyl may be attached as a side chain to the chain containing the conjugated olefinic double bonds as in such acids of this class as alpha-vinyl-acrylic acid, alpha-beta-isopropylidene propionic acid

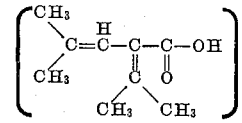

alpha-vinyl cinnamic acid, alpha-isopropenyl-furfural acrylic acid, alpha-isopropenyl-cinnamenyl acrylic acid etc. Moreover the polyunsaturated acid may contain a single carboxyl group as in the case of those just mentioned or it may contain more than one carboxyl group as in such acids as muconic acid; pentadiene (1,3)-dioic-1,5 acid, etc. The above-mentioned acids are all known to the art and can be obtained by known methods, U. S. Patent 2,462,337, for example, disclosing one method of preparing several of the acids disclosed. The preferred acids are sorbic acid and its hydrocarbon homologs and their alpha and beta-chloro derivatives.

The proportions of the essential monomeric materials in the monomeric mixture may be varied somewhat so long as the butadiene-1,3 hydrocarbon is present in the mixture and in the resulting interpolymer in an amount at least 50% by weight. It has been found that the use of as little as 1% of the acid by weight of the total monomers produces an observable influence on the physical properties of the polymer as compared with polybutadiene-1,3, especially when the polymer is converted by an elasto-condensation with a metallic oxide to a polymeric metallo-carboxylate. As the amount of polyunsaturated acid in the monomer mixture (and consequently in the interpolymer) is increased the tensile strength of the polymeric metallo-carboxylates obtained therefrom, as well as of their ordinary sulfur vulcanizates, is increased but the ease of working of the unvulcanized interpolymer is decreased. It is therefore preferred, for obtaining plastic easily-worked rubbery materials, to employ monomer mixtures containing in the range of 1 to 30% by weight of the acid component. When only the butadiene-1,3 hydrocarbon and the acid are interpolymerized this means, of course, that the proportion of butadiene-1,3 hydrocarbon will be in the range of 70 to 99% by weight.

When the polymer is desired primarily for the production of polymeric metallo-carboxylates, the monomeric proportions should be selected so as to yield after polymerization an interpolymer containing certain amounts of free carboxyl (—COOH) groups. Since the percentage of acid in the total monomeric mixture does not indicate the carboxyl content of the interpolymer obtained, the latter will be defined herein in terms of chemical equivalents of carboxyl (COOH) per 100 parts of interpolymer rubber and will be sometimes referred to by the designation e. p. h. r. ("equivalents per hundred rubber"). This value is easily determined, for example, by titration of a polymer solution with alcoholic KOH to a phenolphthalein end-point. Interpolymers of butadiene-1,3 hydrocarbons with unsaturated acids of the above class containing from 0.001 to 0.30 e. p. h. r. of carboxyl are predominantly plastic in nature and are adapted to produce rubbery elastic compositions when condensed with a polyvalent metallic oxide. Interpolymers containing from 0.02 to 0.20 e. p. h. r. of carboxyl are preferred for the production of elastic polymeric metallo-carboxylates having the best balance of properties with those containing from 0.02 to 0.10 e. p. h. r. of (—COOH) being especially preferred for the production of strong elastic compositions having most excellent low temperature flexibility.

In addition to the two essential types of monomers (that is, the butadiene-1,3 hydrocarbon and the polyunsaturated acid), the monomer mixture polymerized may also contain one or more interpolymerizable monoolefinic monomeric materials. Illustrative monoolefinic monomers which may be so interpolymerized include acrylonitrile, alpha-chloroacrylonitrile, the alkyl esters of acrylic and alpha-alkyl acrylic acids such as methyl acrylate, ethyl acrylate, butyl acrylate, 2-ethylhexyl acrylate, n-octyl acrylate, methyl methacrylate, methyl ethacrylate, butyl methacrylate, lauryl methacrylate, and others, styrene, vinylidene chloride, vinyl pyridine, isobutylene and others. Such additional monomeric materials may be considered to be replacements-in-part for either the butadiene-1,3 hydrocarbon or the unsaturated acid. Tripolymers and other multipolymers having excellent properties may be produced from monomeric mixtures containing from 50 to 94% by weight of the butadiene-1,3 hydrocarbon, from 1 to 45%, more preferably 2 to 30%, by weight of the unsaturated acid and from 5 to 40% by weight of one or more than one of the monoolefinic monomers.

In preparing the interpolymers of this invention, monomeric mixtures as above disclosed, are polymerized in an acidic aqueous medium (that is, in an aqueous medium with a pH below 7 in the presence of a suitable polymerization catalyst). The use of an acidic medium insures the production of a true addition-type interpolymer containing interpolymerized free acid (—COOH) groups and having a molecular weight sufficiently high to be possessed of rubber-like properties. The acidic aqueous medium may either be emulsifier-free or it may contain an emulsifier adapted for use under acidic conditions. Suitable emulsifiers include hymolal sulfates and sulfonates such as sodium lauryl sulfate, the sodium salts of sulfonated petroleum or paraffin oils, the sodium salts of dodecane-1-sulfonic acid, octadecane-1-sulfonic acid, etc.; aralkyl sulfonates such as sodium isopropyl benzene sulfonate and sodium isobutyl naphthalene sulfonate; alkali metal salts of sulfonated dicarboxylic acid esters and amides such as sodium dioctyl sulfosuccinate, sodium-N-octadecyl-sulfosuccinamate and the like, and others. Much preferred, however, are the so-called cationic emulsifiers such as the salts of strong inorganic acids and organic bases containing long carbon chains, for example, lauryl amine hydrochloride (especially preferred), the hydrochloride of diethylaminoethyloleylamide, trimethyl cetyl ammonium bromide, cetyl-dimethyl-benzyl ammonium chloride, octadecyl-trimethyl ammonium bromide, dodecyl-trimethyl ammonium bromide, the diethyl cyclohexylamine salt of cetyl sulfuric ester, and others. In addition to the above and other polar or ionic emulsifiers, stable at pH below 7, still other materials which may be used, singly or in combination with one or more of the above-mentioned types of emulsifiers, include the so-called "non-ionic" emulsifiers (some of which are particularly adapted for use in acidic media) such as the polyether alcohols prepared by condensing ethylene oxide with higher alcohols, the fatty alkylolamine condensates, the diglycol esters of lauric, oleic and stearic acids, and others.

The catalyst required for satisfactory polymerization rate, may be any of those commonly employed for the polymerization of butadiene hydrocarbons including the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others.

Particularly preferred are the water-soluble peroxygen compounds such as hydrogen peroxide and the sodium, potassium and ammonium persulfates, the water-soluble oxidation-reduction or "redox" types of catalysts, and the heavy-metal activated, water-soluble peroxygen and redox catalysts. Included in this preferred class are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and the redox-catalyzed polymerization mediums include those of silver, copper(ic), iron, cobalt, nickel and others.

While the polymerization may be carried out in the presence of air, the rate of reaction is ordinarily faster in the absence of oxygen and hence polymerization in an evacuated vessel or under an inert atmosphere such as nitrogen is preferred. The atmosphere at which the polymerization is carried out is not critical, it may be varied widely from $-30°$ to $100°$ C. or higher, though best results are generally obtained at a temperature of about $0°$ C. to about $70°$ C.

In order to minimize variation in the rate of reaction and to maintain a given proportion of each of the two essential monomers in the reaction mixture throughout the polymerization reaction (and thereby improve also the homogeneity of the product and insure incorporation of a desired amount of free (—COOH) groups in the polymer molecules) it is sometimes desirable to introduce the acid (or mixture of acid and monoolefinic monomer) gradually during the course of the reaction. By the latter method, which is well understood by the art, it is possible to obtain efficient interpolymerization of the unsaturated acid.

Other polymerization techniques and practices conventionally employed in the preparation of butadiene styrene and butadiene acrylonitrile synthetic rubbers may also be used in polymerizing the monomer mixtures herein described. For example, the use of mercaptan modifiers during the polymerization is often desirable and results in lower raw polymer Mooney viscosity and other allied properties, although modifiers such as the primary, secondary and tertiary aliphatic mercaptans containing from 4 to 16 carbon atoms appear to have a greater modifying efficiency in the diene-acid system of this invention than in the polymerization of the conventional synthetic rubbers such as the butadiene acrylonitrile or butadiene styrene copolymer rubbers. Still other substances which desirably may be incorporated in the reaction medium include acidic buffers, electrolyte salts, carbon black and others in a manner well understood by the art. Moreover, the polymerization may be terminated, as by addition of a polymerization inhibitor such as hydroquinone or phenyl beta naphthylamine, before conversion of monomer to polymer is complete. The higher the conversion, everything else being equal, the higher the gel or insoluble content of the polymer. Polymers prepared by stopping the reaction at 50 to 90% conversion are more plastic, more soluble, and are possessed of as good or better tensile strength than the polymers prepared at substantially complete conversion.

The polymers of this invention are obtained from the acidic aqueous medium in the form of either a crude but filterable dispersion or a flocculent precipitate (from emulsifier-free media) or as an acidic aqueous polymer dispersion or latex. Isolation of the flocculent polymers involves only filtration and washing with dilute mineral or organic acids so as to remove catalyst and buffer residues while coagulation of the acidic latex is preferably effected so as not to impair or destroy the free carboxyl groups of the polymer. This may be accomplished by admixing the latex with a dilute (ca. 3–15%) hydrochloric, sulfuric or acetic acid solution, or an alcohol such as ethyl alcohol, or a combination of salt (NaCl) and alcohol, or by a dilute (ca. 1–30%) acidic aqueous solution of a polyvalent metal salt of a strong acid such as calcium chloride, calcium nitrate, zinc chloride, alum, and others. Calcium chloride solution (ca. 1–30%) slightly acidulated with HCl will efficiently coagulate the diene-acid interpolymers whether the latex is added to the coagulant or vice versa.

The preparation of typical rubbery interpolymers according to this invention and the properties thereof will be more clearly described in the following specific examples which are intended merely as illustrations of the nature of the invention and not as limitations on the scope thereof.

*Example 1*

A mixture of 200 parts by weight of water and 5 parts by weight of dodecyl amine is prepared and sufficient hydrochloric acid added thereto to neutralize 90% of the amine. To this solution is added 0.4 part by weight of t-dodecyl mercaptan (emulsified in water), 0.2 part by weight of potassium persulfate and 0.2 part by weight of aluminum chloride. The reaction vessel containing this mixture is then sealed and evacuated, the vacuum broken by the addition of a mixture of 94 parts by weight of butadiene-1,3 and 6 parts by weight of sorbic acid, and the reaction vessel and its contents heated to 50° C. while constantly agitating the reaction mixture. Polymerization proceeds smoothly until a conversion of 75% is reached in 17 hours with the production of an acidic synthetic rubber latex. Coagulation of the latex is effected by pouring a 15% solution of HCl into the latex. The resultant coagulum is washed several times with 3 volumes of 1% HCl, then by several clear water washes until HCl-free, and dried in an air oven at 60° C. The carboxyl content of the resulting polymer is 0.04 e. p. h. r.

When this polymer is mixed on a rubber mill with 11.6 parts by weight per 100 parts of rubber (p. h. r.) of zinc oxide and 5 parts of a softener consisting of a complex mixture of paraffinic hydrocarbons known commercially as "Paraflux" and molded for 30 minutes at 280° F., a strong elastic composition is obtained having an ultimate tensile strength of 3530 lbs./sq. in., an elongation of 330% and a modulus of 300% of 3140 lbs./sq. in. The elastic composition has a surprising low temperature flexibility as shown by Gehman Low Temperature Flexibility test whereby the elastic copolymer composition of this example has a $T_5$ of $-62°$ C. and a freezing point (Fp) of $-69°$ C. By way of comparison, polybutadiene synthetic rubber given an optimum sulfur cure in a pure gum composition is possessed of a tensile strength of only 300 lbs./sq. in. and a Gehman $T_5$ of $-47°$ C. and an Fp of $-65°$ C.

When the copolymer of Example 1 is mixed with 1.0 p. h. r. of sulfur, 2.5 p. h. r. of diphenylguanidine, 50 p. h. r. of easy-processing channel black and 5 p. h. r. of "Paraflux" and heated for 30 minutes at 300° F., an elastic composition is obtained having a tensile strength of 1410 lbs./sq. in., a 300% modulus of 870 lbs./sq. in., an elongation of 330% and good low temperature properties. Thus the butadiene sorbic acid copolymer may be vulcanized by sulfur as well as elasticized by a polyvalent metallic oxide such as zinc oxide.

The 94/6 butadiene sorbic acid copolymers are exceedingly resistant to chemical attack in spite of their high unsaturation values (as shown by iodine numbers before and after a metallic oxide cure). The polymeric metallo-carboxylate made from a 94/6 mixture of butadiene and sorbic acid (Example 1 above) is boiled 26 hours with water. Its tensile strength and elongation are unchanged after the treatment. When boiled for 26 hours with a 10% NaOH solution the properties of the cured composition likewise were unchanged. Similarly when boiled for 26 hours with 10% sulfuric acid or when heated in air at 100° C. for 28 hours the properties were unchanged. Another sample of the cured elastic composition is treated in solution first with carbon bisulfide and then with dimethylamine and the recovered polymer subjected to short-path molecular distillation. Such a treatment should remove free zinc or zinc oxide. However, the treated polymer did not show any degradation of physical properties. Other elastic polymeric metallo-carboxylates prepared from the interpolymers of sorbic acid and other polyunsaturated organic acids have this characteristic resistance to chemical attack. The polymeric metallo-carboxylates also are from 5 to 10 times better in their resistance to ozone than sulfur-vulcanized polybutadiene and the sulfur-vulcanized butadiene styrene copolymers known as "GR–S."

In a similar fashion, polymerization in the dodecylamine hydrochloride system of Example 1 of a monomeric mixture of 90 parts butadiene and 10 parts sorbic acid proceeds to 75° C. conversion occurs in 17 hours at 50° C. The copolymer contains 0.07 e. p. h. r. of (—COOH) and when admixed with 5 p. h. r. of zinc oxide and 5 p. h. r of Paraflux and heated for 30 minutes at 300° F. yields an elastic, almost transparent composition having a tensile strength of 4650 lbs./sq. in., an elongation of 330%, a 300% modulus of 4080 lbs./sq. in., a Gehman $T_5$ of $-50°$ C., and a Gehman Fp of $-63°$ C. Increasing the zinc oxide content to 15 p. h. r. nearly doubles the tensile strength of the butadiene sorbic acid copolymer prepared from the 90/10 mixture.

*Example 2*

A mixture of 95.1 parts by weight of butadiene and 4.9% by weight of vinyl acrylic acid is polymerized in the dodecylamine hydrochloride medium of the foregoing example to 97% conversion to yield a copolymer analyzing 0.053 e. p. h. r. of (—COOH) which corresponds to 5.2% interpolymerized vinyl acrylic acid. The copolymer cures with from 5 to 10 p. h. r. of zinc oxide to yield strong elastic compositions. Similarly, substitution of 5 parts by weight of either of beta-chlorovinyl acrylic acid or muconic acid for the vinyl acrylic acid yields monomeric mixtures with 95 parts by weight of butadiene-1,3 which produce copolymers containing respectively, 0.02 and 0.04 e. p. h. r. of (—COOH) which when cured with zinc oxide produce strong elastic compositions having good low temperature flexibility.

*Example 3*

Substitution of equivalent amounts of alpha- and beta-chloro sorbic acids for the sorbic acid in the reaction medium of Example 1 produces plastic rubbery copolymers which are rendered strong and elastic when mixed with a metallic oxide and heated. The alpha- and beta-chloro sorbic acids seem to be more readily polymerizable with butadiene-1,3 hydrocarbons than sorbic acid.

*Example 4*

A mixture of 71.5 parts by weight of butadiene-1,3, 17.3 parts by weight of styrene, and 11.2 parts by weight of sorbic acid are polymerized to 95% conversion in a dodecylamine hydrochloride recipe similar to that of Example 1. The tripolymer which contains 0.09 e. p. h. r. of (—COOH) and has a Mooney viscosity after 4 minutes at 212° F. using the small rotor of 96, when admixed with 8 p. h. r. of zinc oxide and 30 p. h. r. of an easy processing channel black and molded for 30 minutes at 300° F. exhibits a tensile strength of 3310 lbs./sq. in., a 300% modulus of 3,000 lbs./sq. in., an elongation of 360%, a Gehman $T_5$ of $-25°$ C. and a Gehman Fp of $-42°$ C.

*Example 5*

A monomeric mixture consisting of 89.9% by weight of butadiene-1,3, 5% by weight of acrylonitrile, and 5.1% by weight of sorbic acid reacts in the dodecylamine hydrochloride medium of Example 1 to a conversion of 75% in 8.8 hours at 50° C. The resulting tripolymer when mixed with 4 p. h. r. of zinc oxide and 50 p. h. r. of carbon black and molded for 40 minutes at 300° F. yields a strong elastic composition having a tensile strength of 2380 lbs./sq. in., a 300% modulus of 1570 lbs./sq. in., an elongation of 435%, and a Gehman $T_5$ of $-54°$ C. and an Fp of $-61°$ C.

*Example 6*

A mixture of 88.8 parts by weight of butadiene-1,3 and 11.2 parts by weight of sorbic acid are polymerized to 71% conversion in a dodecylamine hydrochloride recipe similar to that of Example 1. The resultant polymer is possessed of an intrinsic viscosity of 0.53, a gel content of 25%, and a Mooney viscosity after 4 minutes at 212° F. using the large rotor of 57. The polymer is found to contain 0.087 e. p. h. r. of (—COOH). When admixed on a rubber mill with 7 p. h. r. of zinc oxide and heated for 40 minutes at 300° F. an elastic clear gum composition is formed having a tensile strength of 11,100 lbs./sq. in., a modulus at 300% elongation of 1560 lbs./sq. in., and an ultimate elongation of 575%.

*Example 7*

Increasing the sorbic acid content in the polymerization recipe of Example 1 to 22.8 parts by weight results in a copolymer containing 0.17 e. p. h. r. of (—COOH) and small rotor Mooney viscosity after 4 minutes at 212° F. of 45, which when admixed with 20 p. h. r. of zinc oxide and 30 p. h. r. of stearic acid and heated for 40 minutes at 300° F. produces a hard but flexible clear gum composition having a tensile strength in excess of 6000 lbs./sq. in. Increasing the sorbic content to 28.5 parts by weight of sorbic acid (per 100 of total monomers) (0.297 e. p. h. r. —COOH theoretically) produces a copolymer (at 77% conversion) having a small rotor Mooney viscosity of 82 and containing 0.25 e. p. h. r. of (—COOH). The latter copolymer is harder than the preceding copolymer. Increasing the sorbic acid content in the original monomer charge to 35 to 40 parts (per 100 parts total of monomers) produces copolymers containing from 0.28 to 0.30 e. p. h. r. of (—COOH) which when mixed with zinc oxide and heated produce polymeric metallo-carboxylates of extremely high tensile strength and great hardness.

*Example 8*

The copolymers of the foregoing examples also are successfully prepared at temperatures of from 30 to 50° C. in an emulsifier-free acidic aqueous medium having, for example, the following composition:

| Material: | Parts/wt. |
|---|---|
| Monomers (to total) | 100.0 |
| Water | 400.0 |
| Potassium persulfate | 3.0 |
| Sodium bisulfite | 3.0 |

The product in each case varies from a coarse polymeric dispersion to a loose flocculent precipitate. The polymers are otherwise equivalent, however, to those prepared in the dodecylamine hydrochloride system described in Example 1.

Excellent stable acidic polymeric dispersions or latices are produced by polymerization at a pH ranging from 2.0 to 4.0 in the presence of various hymolal sulfates and alkaryl sulfonates as emulsifiers, for example, in a reaction mixture having the following proportions:

| Material: | Parts/wt. |
|---|---|
| Monomers (to total) | 100.0 |
| Water | 100 to 15.0 |
| Emulsifier #1* | 2.0 |
| Emulsifier #2** | 1.0 |
| Ammonium persulfate | 0.2 |
| Sulfuric acid (or to adjust to a pH of 3.0) | 0.1 |

* #1, a commercial grade of a sodium alkaryl sulfonate known as "Nacconol NRSF."
** #2, an alkylated aryl polyether alcohol known as "Triton X–100 or N–100."

Latices resulting from the latter type polymerization recipe, preferably when adjusted to a pH of 7 with ammonia or the like, are especially adapted to use as dipping or film-forming applications.

The interpolymers of this invention have been shown to provide not only new and unique elastic compositions when condensed with a polyvalent metallic oxide but also when subjected to ordinary sulfur vulcanization to provide strong elastic vulcanizates having high strength and excellent low temperature flexibility. Thus the olefinically polyunsaturated organic acids have a stronger comonomer action then styrene and other monomers, that is, less of the acid is required to produce a polymer of equivalent or superior properties. Because of their ability to be converted to strong elastic compositions without reinforcing agents, the interpolymers of this invention are especially adapted to produce transparent or light colored sheetings, films, etc. The interpolymers because of their chemical inertness and good low temperature flexibility are also adapted for use in refrigerator gaskets, electrical insulation and the like.

The above specific examples have been cited only for purposes of illustration and it is not intended that the invention be limited thereby for it is to be understood that wide variations in the nature and proportions of the materials polymerized and in the polymerization conditions may be effected without departing from the spirit and scope of the invention as defined by the appended claims.

I claim:

1. A rubbery interpolymer of a butadiene-1,3 hydrocarbon and a polyunsaturated aliphatic carboxylic acid containing at least two olefinic double bonds in conjugated relation and having one of said olefinic conjugated double bonds in alpha-beta position with respect to a carboxyl group, said interpolymer containing at least 50% by weight of interpolymerized butadiene-1,3 hydrocarbon.

2. A rubbery interpolymer of a butadiene-1,3 hydrocarbon and a sorbic acid, said interpolymer containing at least 50% by weight of interpolymerized butadiene-1,3 hydrocarbon.

3. A rubbery interpolymer consisting essentially of 70 to 99% by weight of butadiene-1,3 and 1 to 30% by weight of sorbic acid.

4. A rubbery interpolymer of 50 to 94% by weight of butadiene-1,3, 5 to 40% by weight of styrene and 2 to 30% by weight of sorbic acid.

5. A rubbery interpolymer of 50 to 94% by weight of butadiene-1,3, 5 to 40% by weight of acrylonitrile, and 2 to 30% by weight of sorbic acid.

6. The method which comprises polymerizing in an acidic aqueous medium a monomeric mixture comprising a butadiene-1,3 hydrocarbon and a polyunsaturated aliphatic carboxylic acid containing at least two olefinic double bonds in conjugated relation and having one of said olefinic conjugated double bonds in alpha-beta position with respect to a carboxyl group.

7. The method which comprises polymerizing in an acidic aqueous emulsion a mixture of monomeric materials containing 70 to 99% by weight of a butadiene-1,3 hydrocarbon and 1 to 30% by weight of sorbic acid.

References Cited in the file of this patent

UNITED STATES PATENTS

| Number | Name | Date |
|---|---|---|
| 2,234,204 | Starkweather et al. | Mar. 11, 1941 |
| 2,629,707 | Charles | Feb. 24, 1953 |

OTHER REFERENCES

Ind. and Eng. Chem., vol. 38, No. 11, November 1946, page 68 of the advertising section.